Patented June 22, 1943

2,322,542

UNITED STATES PATENT OFFICE 2,322,542

SURFACE COVERING COMPOSITION CONTAINING SYNTHETIC RESINS AND PROCESS OF PRODUCING SAME

Donald G. Patterson, Stamford, Conn., assignor to American Cyanamid Company, New York, N. Y., a corporation of Maine No Drawing. Application March 28, 1940, Serial No. 326,382

3 Claims. (Cl. 260—22)

This invention relates to the production of surface coverings such as floor coverings which contain synthetic resins.

An object of this invention is to produce improved surface coverings utilizing synthetic resins modified with drying oil fatty acids.

Another object of this invention is to provide a process which will produce synthetic resins particularly satisfactory for use in floor covering compositions.

These and other objects are attained by the use, as a modifier for the synthetic resins used in the surface coverings, or drying oil fatty acids which have had a substantial proportion of the more saturated components removed by refrigeration and filtration to produce a product of substantially increased iodine number. The use of certain synthetic resins produced by the reaction of a terpene, fumaric acid, and a polyhydric alcohol is also advantageous in the attainment of the objects of this invention.

The following examples in which the proportions are in parts by weight are given by way of illustration and not in limitation.

EXAMPLE 1

| | Parts |
|---|---|
| Alpha-pinene | 150 |
| Fumaric acid | 116 |
| Triethylene glycol | 150 |
| Refrigerated linseed oil fatty acids | 157 |
| Glycerol | 18 |
| P-toluene sulfonic acid | 0.5 |

The terpene, fumaric acid and glycol are heated under reflux and preferably in an inert atmosphere in the presence of the p-toluene sulfonic acid as a catalyst. The apparatus in which the reaction is carried out preferably has a water trap through which the reflux condensate passes on its return to the reaction chamber. By this means the water formed during the condensation is continuously separated and removed from the reactants and the reaction products. The condensation and esterification are continued until the acid number is less than about 10. The unreacted pinene is distilled off and the refrigerated linseed oil fatty acids together with the glycerol are added to the resin. The reaction mixture is then maintained at about 200–225° C. until an acid number of 8 or less is reached. The resin may then be polymerized or bodied by blowing with air or oxygen at elevated temperatures, e. g. 50–100° C. using the methods and equipment well known in the linoleum industry. It is usually desirable to add a small proportion of a suitable drier such as cobalt naphthenate, lead naphthenate, or mixtures of these or other oil soluble driers. The resin may be exposed to ultra-violet light during bodying or polymerization. When polymerized to a suitable viscosity the resin is ready for use as a binder for surface coverings. It is sometimes advantageous to allow the polymerized binder to age for from 3 days to 3 weeks before use.

*Preparation of sheeted surface covering*

| | Parts |
|---|---|
| Binder | 30 |
| Wood flour | 30 |
| Lithopone | 20 |
| Whiting | 20 |

These substances with or without a small proportion of drier, e. g. 0.1% of cobalt naphthenate are mixed together, e. g. in an internal mixer. The compacted mass thus obtained may be disintegrated as by a set of "scratch rolls" which comprise a plurality of rolls having intermeshing teeth projecting from their surfaces. The resulting material is sheeted on calender rolls or optionally it may be further mixed and disintegrated and then calendered. The material may be calendered onto burlap or other fibrous backing if desired. The sheeted material is placed in a stoving oven through which a current of heated air at about 70° C. to about 90° C. is circulated until the material is completely "seasoned," i. e. until the sheet acquires the necessary degree of hardness.

The hardness may be measured by any of the methods generally employed in the manufacture of linoleum. See the Federal Stock Catalogue, section 4, part 5, pp. LLL–L–351 et seq., and pp. LLL–L–361 et seq. for the method employed herein. The time required for seasoning a 2 mm. sheet of this composition is about 8–14 days. The resulting "seasoned" floor covering has an alkali resistance of about 0.24 mm. penetration. The alkali resistance may be determined by measuring the depth in millimeters to which a 5% solution of sodium hydroxide in water penetrates in one hour at a temperature of 70° F.

The seasoning speed of a 2 mm. sheet of the same type of binder which is prepared with untreated linseed oil fatty acids in place of the refrigerated linseed oil fatty acids is about 20–30 days and the alkali resistance of such a composition is about 0.28 mm. penetration. Aside from the marked improvement in the alkali resistance and faster seasoning speed, the finished product has much better chemical resistance in general than surface coverings produced with other binders.

EXAMPLE 2

| | Parts |
|---|---|
| Beta pinene | 272 |
| Fumaric acid | 116 |
| Triethylene glycol | 150 |
| Refrigerated linseed oil fatty acids | 157 |
| Glycerol | 18 |
| Stannic chloride-dioxanate | 2.7 |

The terpene, fumaric acid and glycol are heated under reflux and preferably in an inert atmosphere in the presence of the stannic chloride-dioxanate as a catalyst. The apparatus in which the reaction is carried out preferably has a water trap through which the reflux condensate passes on its return to the reaction chamber. In this way the water formed during the condensation is continuously separated and removed from the reactants and the reaction products. The condensation and esterification are continued until the acid number is less than about 10. The unreacted pinene is distilled off and the refrigerated linseed oil fatty acids together with the glycerol are added to the resin. The reaction mixture is then maintained at about 200–225° C. until an acid number of 8 or less is reached. The resin may then be polymerized or bodied by blowing with air or oxygen at elevated temperatures, e. g. 50–100° C. as described in Example 1.

The above examples describe the use of refrigerated linseed oil fatty acids and by the use of such acids far superior effects are obtained as compared with the use of raw linseed oil fatty acids. The differences which mark the use of the refrigerated linseed oil fatty acids as compared with the raw linseed oil fatty acids are evident with various types of alkyd resin binders. It is to be noted, however, that the terpene-fumaric acid-glycol resins described in the above examples when used to produce surface covering compositions result in products of particularly high grade and such compositions show innumerable improvements as compared with the ordinary linoleums or as compared with the other surface coverings which have previously been produced utilizing other synthetic resins. The outstanding characteristics which pertain to the surface covering compositions produced with the binders set forth in the above examples are retained to a considerable degree even if raw linseen oil fatty acids (or the corresponding glycerides) be used in place of part or all of the refrigerated linseed oil fatty acids. It is to be emphasized that in order to obtain a resinous binder which will produce surface covering compositions having all of the desirable properties characteristic of those produced with the binder described above, it is necessary that the procedure for producing the resin be followed carefully. Furthermore the proportion of catalyst as well as the selection of catalyst is important in order to obtain a resin having the optimum properties. It has been found that stannic chloride-dioxanate or p-toluene sulfonic acid is particularly useful in order to obtain satisfactory resins. If insufficient catalyst be used a relatively small proportion of pinene or other such terpene will be combined, thereby producing a resin which will make weak surface covering compositions having poor flexibility and poor alkali resistance. On the other hand if a very large proportion of catalyst be employed so much terpene will be combined that a resin is produced which not only oxidizes and seasons very slowly but also produces a surface covering having poor chemical resistance properties. Accordingly it has been found that between 2 and 3 parts of stannic chloride-dioxanate or 0.3–0.6 part of p-toluene sulfonic acid per mol of fumaric acid give the optimum properties desired.

Preparation of refrigerated drying oil fatty acids

Linseed oil fatty acids having an iodine number for example of about 186–190 are placed in a tank provided with cooling coils and an agitator which will scrape frozen particles off of the cooling coils. A suitable refrigeration medium is circulated in the cooling coils and the agitator is run at a very low rate of speed, e. g. 3 R. P. M. The agitator must be run slowly during the freezing so that the crystals will be sufficiently large to be separated easily by filtration. The temperature is lowered to between about −10° C. and +10° C., preferably to 5° C. The acids are then filtered during which operation the temperature is maintained at about 5° C. A suitable filter aid and/or absorbent material such as bentonite may be added to the acids and furthermore they may be centrifuged if desired.

The filtrate thus obtained has an iodine number of about 205–207 while the filter cake has an iodine number of about 138–145. The yield of filtrate is about 60–65% and the yield of filter cake is about 35–40%.

In the same way other unsaturated fatty acids of the drying oil type may be subjected to refrigeration in order to raise the iodine number appreciably. The raw oils generally have an iodine number between about 175 and 195 and the resulting product should have an iodine number between about 200 and 220.

The binders for my surface covering compositions may include various synthetic resins such as those produced by the reaction of dibasic acids, such as fumaric, maleic, itaconic, sebacic, pthalic, adipic and succinic acids or acid anhydrides thereof if available, with a polyhydric alcohol such as glycerol, ethylene glycol, di-, tri-, tetra-, penta-, hexa-, octa-, dodeca-ethylene glycols, decamethylene glycol, 1,3-butylene glycol, alpha-propylene glycol, octadecanediol, etc., and suitably modified with refrigerated drying oils or drying oil acids. Such resins may of course be modified in any of the known ways with monobasic and monohydric alcohols if desired. Generally I have found that resins made by the reaction of fumaric acid, triethylene glycol and a non-conjugated terpene hydrocarbon of the $C_{10}H_{16}$ series, e. g. alpha- and beta-pinene, dipentene, limonene, and terpinolene are particularly suitable. Of these, superior results are usually obtained with dipentene, alpha- and beta-pinene. Obviously mixtures of these may be employed, particularly such mixtures as may be obtained in the various commercial grades of terpenes which are obtained by fractional distillation. It is also possible to use the conjugated terpene hydrocarbons of the $C_{10}H_{16}$ series, e. g. alpha- and beta-phellandrenes, alpha-terpinene, $\Delta^{-3,8(9)}$ p-menthadiene, etc. Furthermore maleic acid or maleic anhydride may be used in place of the fumaric acid although superior results are obtained if fumaric acid be used.

Other fillers may be substituted for part or all of that used in the above example, e. g. cork, alpha-cellulose pulp, asbestos, cottonwood tree pulp, walnut shell meal, glass fibers, foliated glass, etc. Various pigments may be substituted for all or part of that used in the above example, e. g. lithopone, barytes, zinc oxide, titanium oxide, chromates, red lead, white lead, malachite green, chrome yellow, chrome green, Prussian blue, iron oxide, as well as various dyes, lakes, etc.

Among the drying oil acids which may be substituted for all or part of those used in the above examples are: menhaden or fish oil acids, tung oil acids, soyabean oil acids, perilla oil acids, oiticica oil acids, Scheiber oil acids, sunflower seed oil acids, etc. Furthermore, part of the drying oil acids may be substituted with the drying oils themselves. Obviously preformed glycerides or other esters of the refrigerated drying oil acids may be used. The term drying oil as used herein is intended to include not only the drying oils, but also the so-called semidrying oils. Obviously it is possible to use mixtures of drying oils, and mixtures of a drying oil with fatty oils of the non-drying type may be employed in some instances.

The natural drying oils are mixtures of glycerides some of which include fatty acid radicals having different degrees of unsaturation. Accordingly it is not possible to separate satisfactorily the unsaturated fatty acid constituents of the drying oils by merely refrigerating the oils themselves. On the other hand the fatty oil acids may be refrigerated according to the process described above and the resulting highly unsaturated fatty acids combined with glyceride to give an oil which may be employed in the production of binders similar to, but vastly superior to, those well known in the linoleum art. Such binders may be prepared by any of the well known methods such as for example those described in British Patent No. 305,656. In this connection the so-called "scrim oil" or "shed oil" either alone or fluxed with rosin or other gums or resins and/or mixed with a proportion of the so-called "mechanical oil" may be used. Either of these types of oils may be used singly if desired.

In the preparation of binders from drying oils prepared from refrigerated drying oil acids, rosin may be added as is generally customary in the art although other substances of the same type may be used, e. g. Kauri gum, Congo gum, ester gum, abietic acid and its esters, pimaric acid, etc.

The term "seasoning" as applied to surface covering compositions indicates the process of curing by heating or equivalent treatment to polymerize and/or oxidize the composition to a stage wherein the surface covering is sufficiently hard and resistant to abrasion to be suitable for its intended purpose and yet is still sufficiently flexible to permit the usual bending and rolling required of surface covering material such as linoleum.

The term linoleum as used herein is intended to cover not only compositions having as a binder, materials derived from linseed oil but also all surface covering materials having a siccative binder.

Obviously many modifications and variations in the processes and compositions described above may be made without departing from the spirit and scope of the invention as defined in the appended claims.

I claim:

1. In a process of preparing a sheeted surface covering of the linoleum type, the steps which comprise simultaneously heating a non-conjugated terpene hydrocarbon of the $C_{10}H_{16}$ series, a polyhydric alcohol, and a member of the group consisting of maleic acid and fumaric acid in the presence of 0.3–0.6 part of p-toluene sulfonic acid per mol of acid, subsequently adding linseed oil fatty acids which are liquid at about 5° C. and which have an iodine number above about 200, and heating until the linseed oil fatty acids have reacted.

2. In a process of preparing a sheeted surface covering of the linoleum type, the steps which comprise simultaneously heating beta-pinene, fumaric acid and triethylene glycol in the presence of 0.3–0.6 part of p-toluene sulfonic acid per mol of fumaric acid, subsequently adding linseed oil fatty acids which are liquid at about 5° C. and which have an iodine number above about 200, and heating until the linseed oil fatty acids have reacted.

3. A sheeted surface covering of the linoleum type containing as a siccative binder the product obtained by the process steps of claim 1.

DONALD G. PATTERSON.

CERTIFICATE OF CORRECTION.

Patent No. 2,322,542.                                        June 22, 1943.

DONALD G. PATTERSON.

It is hereby certified that error appears in the printed specification of the above numbered patent requiring correction as follows: Page 1, first column, line 13, for "or" read --of--; page 3, first column, line 30, for "glyceride" read --glycerine--; and that the said Letters Patent should be read with this correction therein that the same may conform to the record of the case in the Patent Office.

Signed and sealed this 3rd day of August, A. D. 1943.

Henry Van Arsdale, (Seal)                             Acting Commissioner of Patents.